(12) United States Patent
Zhou et al.

(10) Patent No.: US 9,198,142 B2
(45) Date of Patent: Nov. 24, 2015

(54) TRANSMIT POWER CONTROL FOR DYNAMIC SPECTRUM ACCESS

(75) Inventors: Xiangwei Zhou, Atlanta, GA (US); Young Hoon Kwon, San Diego, CA (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1003 days.

(21) Appl. No.: 12/259,574

(22) Filed: Oct. 28, 2008

(65) Prior Publication Data

US 2009/0305639 A1 Dec. 10, 2009

Related U.S. Application Data

(60) Provisional application No. 61/058,873, filed on Jun. 4, 2008.

(51) Int. Cl.
*H04B 1/00* (2006.01)
*H04W 52/34* (2009.01)
*H04W 52/50* (2009.01)
*H04W 72/12* (2009.01)

(52) U.S. Cl.
CPC ............ *H04W 52/343* (2013.01); *H04W 52/50* (2013.01); *H04W 72/1231* (2013.01)

(58) Field of Classification Search
CPC .. H04B 7/2628; H04W 52/04; H04W 52/343; H04W 52/346; H04W 52/24
See application file for complete search history.

(56) References Cited

U.S. PATENT DOCUMENTS

| 5,732,328 | A | * | 3/1998 | Mitra et al. | 455/69 |
|---|---|---|---|---|---|
| 6,138,024 | A | * | 10/2000 | Evans et al. | 455/452.2 |
| 7,432,679 | B2 | | 10/2008 | Pronovost et al. | |
| 2005/0271000 | A1 | * | 12/2005 | Schulist | 370/328 |
| 2005/0282550 | A1 | * | 12/2005 | Cho et al. | 455/447 |
| 2007/0140289 | A1 | * | 6/2007 | Tellado et al. | 370/445 |
| 2008/0089279 | A1 | | 4/2008 | Hu et al. | |
| 2008/0160927 | A1 | * | 7/2008 | Bar-Ness et al. | 455/73 |
| 2009/0124206 | A1 | * | 5/2009 | Kwon et al. | 455/63.1 |
| 2009/0149135 | A1 | * | 6/2009 | Mangold et al. | 455/77 |
| 2009/0207735 | A1 | * | 8/2009 | Ben Letaief et al. | 370/237 |

FOREIGN PATENT DOCUMENTS

CN 1878027 A 12/2006
WO WO 2006/039808 A1 4/2006

OTHER PUBLICATIONS

Hoang, A.T., et al., "Adaptive Scheduling of Spectrum Sensing Periods in Cognitivie Radio Networks," IEEE GLOBECOM Proceedings, 2007, pp. 3128-3132.

(Continued)

*Primary Examiner* — Zhiyu Lu
(74) *Attorney, Agent, or Firm* — Slater & Matsil, L.L.P.

(57) ABSTRACT

A transceiver and a method of transmitting data are provided. A frequency band, such as a licensed frequency band, is monitored during a sensing block. Based upon the use of the frequency band during the sensing block, a probability of non-interfering is calculated during a plurality of time periods in a subsequent inter-sensing block. The probability of non-interfering is used by the transceiver to determine a transmit power level such that the possibility of interference with licensed use on the frequency band is reduced. Embodiments of the present invention may be used to improve the transmission rate of the cognitive radio user.

18 Claims, 4 Drawing Sheets

(56) References Cited

OTHER PUBLICATIONS

Kim, H., et al., "Efficient Discovery of Spectrum Opportunities with MAC-Layer Sensing in Cognitive Radio Networks," IEEE Transactions on Mobile Computing, vol. 7, No. 5, May 2008, pp. 533-545.

Pei, Y., et al., "Sensing-Throughput Tradeoff in Cognitive Radio Networks: How Frequently Should Spectrum Sensing Be Carried Out?," 18$^{th}$ Annual IEEE Symposium on Personal, Indoor and Mobile Radio Communications, 2007, 5 pgs.

Vujiči,ć, B., et al., "Modeling and Characterization of Traffic in Public Safety Wireless Networks," Proc. Int. Symp. Performance Evaluation of Comput. and Telecommun. Syst., Philadelphia, PA, Jul. 2005, pp. 214-223.

Second Chinese Office Action with English Translation received in Chinese Application No. 200980120580.5, mailed Mar. 18, 2013, 15 pages.

Chinese Search Report received in Chinese Application No. CN200980120580.5 dated Mar. 3, 2009, 2 pages \* cited by examiner

TRANSMIT POWER CONTROL FOR DYNAMIC SPECTRUM ACCESS

This application claims the priority benefit of commonly owned U.S. Provisional Patent Application having Ser. No. 61/058,873 entitled, "Transmit Power Control for Dynamic Spectrum Access," filed on Jun. 4, 2008, which is hereby incorporated by reference.

TECHNICAL FIELD

This invention relates generally to communications systems and, in particular embodiments, to transmit power control for dynamic spectrum access priority.

BACKGROUND

Cognitive radio is a paradigm that has recently been introduced to improve the spectrum utilization for wireless communications by allowing a network or a wireless node to alter its transmission and/or reception parameters to utilize a licensed band when licensed activity is absent, thereby allowing cognitive radio users to communicate efficiently while avoiding interference with licensed or unlicensed users. Generally, the cognitive radio user successively monitors the dynamic usage of the licensed frequency band and utilizes it when the licensed activity is absent. When the cognitive radio user determines that licensed activity is absent, the cognitive radio user alters its transmission and/or reception parameters to use the licensed frequency band. This alteration of parameters is based on the active monitoring of several factors in the external and internal radio environment, such as radio frequency spectrum, user behavior, and network state.

A periodic sensing framework is usually adopted such that each frame of the cognitive radio user consists of a sensing block and an inter-sensing block. The inter-sensing block is used for data transmission after a licensed frequency band is identified as being unoccupied in the sensing block.

The cognitive radio user typically maintains constant transmit power levels in the inter-sensing block (for data transmission) and stops transmission as soon as the next sensing block is scheduled. Maintaining constant transmit power levels until the next sensing block is scheduled, however, may cause interference with the licensed user. For example, as the ending moment of the data block in the inter-sensing period approaches, the licensed user has a higher probability to reoccupy the frequency band. If the licensed user attempts to utilize the licensed frequency band prior to the end of the data transmission by the cognitive radio user, then the cognitive radio user's transmission may interfere with the licensed user.

Accordingly, there is a need for a power control system and method that takes into consideration the non-interfering probability, thereby improving the bandwidth efficiency and suppressing interference.

SUMMARY OF THE INVENTION

These and other problems are generally solved or circumvented, and technical advantages are generally achieved, by preferred embodiments of the present invention which provides transmit power control for dynamic spectrum access priority.

In an embodiment, a method of transmitting data is provided. The method includes sensing, during a sensing block, whether a frequency band is idle or busy. A probability of non-interfering is derived for a plurality of periods in an inter-sensing block, and based upon the probability of non-interfering, a power level is derived.

In another embodiment, another method of transmitting data is provided. The method includes acquiring statistical information on the use of a frequency band and determining a probability of non-interfering for a plurality of time periods. Based upon the probability of non-interfering, a transmit power level is determined for the respective time periods.

In another embodiment, a transceiver for transmitting data is provided. The transceiver includes a memory, a processor, a transmitter, and a receiver. The processor varies a transmit power level for transmitting data on a frequency band based upon a probability of non-interfering, wherein the probability of non-interfering is based upon activity detected in the frequency band.

In an embodiment, a method pairs the transmit power of a cognitive radio user with a non-interfering probability at each data sample after licensed activity is identified as absent. This method can include, for example, acquiring statistics of licensed channel occupancy, determining the probability of non-interfering for each sampling point during data transmission, and allocating the transmit power matching the probability.

In an embodiment, the statistics of the licensed channel occupancy may include the average present and absent periods of the licensed activity.

In another embodiment, the average present and absent periods can be acquired from previous measurements of the licensed channel through successive spectrum sensing.

In another embodiment, the probability of non-interfering for each sampling point during data transmission to determine can be the conditional probability that the licensed activity is absent given that the licensed activity is identified as absent before data transmission starts.

In another embodiment, the conditional probability can be estimated with the statistics of the licensed channel occupancy and detection errors of the spectrum sensing component.

In another embodiment, the detection errors can include the possibilities for claiming the absence of the licensed activity as presence or the presence of the licensed activity as absence.

In another embodiment, the error probabilities can be acquired through historic comparisons of spectrum sensing decisions and transmission acknowledgments as well as feedbacks.

In another embodiment, the average transmission rate and interference power can be defined to characterize the system performance.

In another embodiment, the transmit power for each sampling point can be allocated satisfying the average transmit power constraint.

In another embodiment, the transmit power for each sampling point can be allocated matching the non-interfering probability, so that the expected transmission rate of the cognitive radio user is maximized.

In another embodiment, the transmit power can be allocated so that the possible interference with the licensed user is reduced at the same time.

In another embodiment, the transmit power can be allocated as a function of the non-interfering probability at each data sample with the optimal performance, or simply a smoothly decreasing function with a data sample index bearing certain performance loss.

In another embodiment, the transmit power control can also be implemented as varying the rate of the cognitive radio user matching the non-interfering probability at each data sample.

In another embodiment, the system performance can be improved in any periodic spectrum sensing framework with fixed or flexible frame structure.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
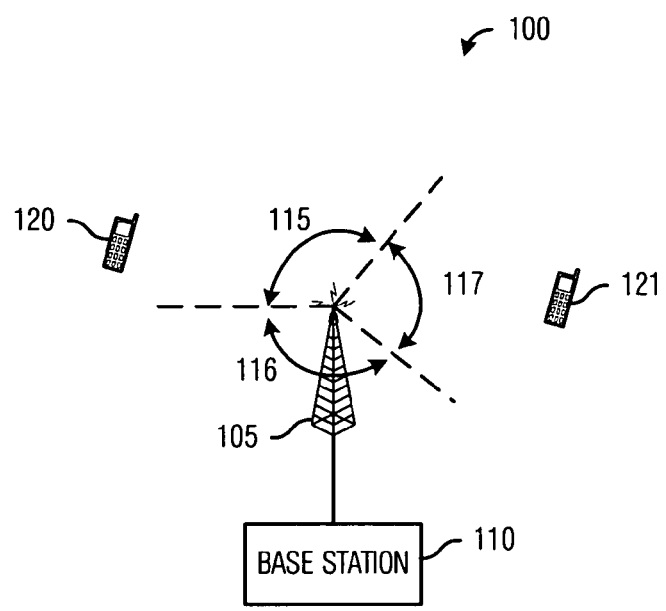
FIG. 1 is a system diagram illustrating embodiments of the present invention.

FIG. 1 illustrates a diagram of a portion of a wireless communications system 100 in accordance with an embodiment of the present invention. As shown in FIG. 1, an antenna 105, such as an antenna of a base station (BS) 110, operating in the wireless communications system 100, may be partitioned into three sectors, such as sector 115, sector 116, and sector 117. Although shown in FIG. 1 as a single antenna, the antenna 105 may be comprised of three individual antennas, with one antenna per sector. The BS 110 may be capable of transmitting separate signals within the different sectors. The BS 110 is typically capable of communicating with multiple mobile stations (MSs), such as MS 120 and MS 121, within their respective sectors. Alternate names for a MS may be user, mobile terminal (MT), user equipment (UE), access terminal (AT), and so forth.

Figure 2:
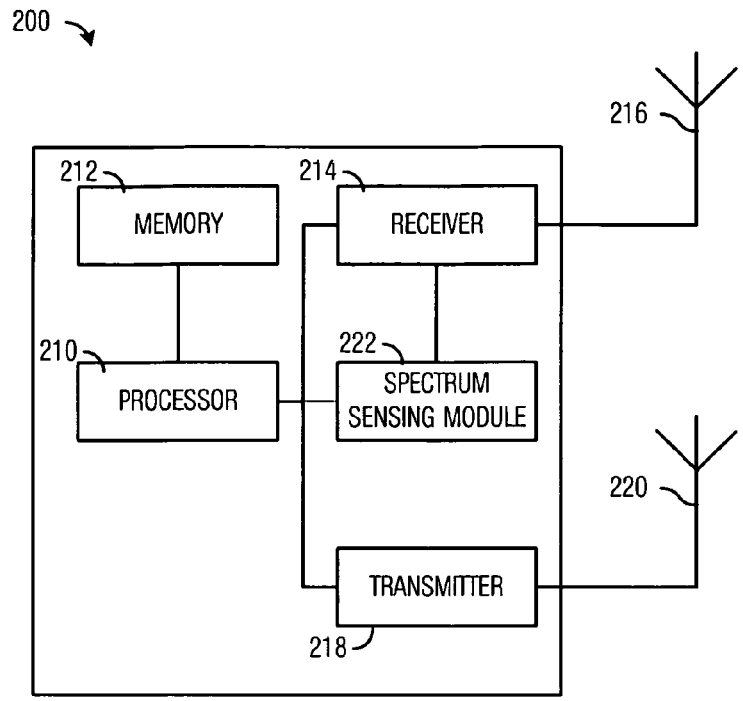
FIG. 2 is a block diagram of a transceiver in accordance with an embodiment of the present invention.

FIG. 2 is a block diagram of a cognitive radio transceiver 200 in accordance with an embodiment of the present invention. It should be noted that the cognitive radio transceiver 200 illustrated in FIG. 2 is provided for illustrative purposes only and illustrates the basic components of a cognitive radio transceiver 200, which may represent the MS 120, 121 and/or the BS 110. It should also be noted that other elements, such as power supplies, buses, cabling, external connections, and the like may be present although not explicitly shown in FIG. 2.

In an embodiment, the cognitive radio transceiver 200 includes a processor 210 and a memory 212, which may store applications, data, and various operating constraints (e.g., QoS constraints). The processor 210 controls a receiver 214 that is coupled to a receive antenna 216 for the purpose of controlling and processing reception of data and/or control signals. The processor 210 is also coupled to and controls a transmitter 218 for the purpose of providing data and control signals to be transmitted via a transmit antenna 220, in addition to controlling the transmit power levels to be used by the transmitter 218 for transmitting. Additionally, a spectrum sensing module 222 is coupled to the receiver 214 and the processor 210. As will be discussed in greater detail below, the spectrum sensing module 222 monitors the licensed frequency band to determine the probability of the licensed frequency band being idle or busy during a subsequent period.

Figure 3:
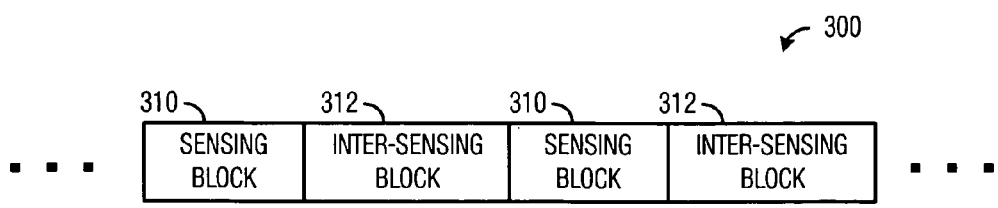
FIG. 3 illustrates a frame structure for periodic spectrum sensing in accordance with an embodiment of the present invention.

FIG. 3 illustrates a frame structure that may be used in accordance with an embodiment of the present invention. The processing sequence 300 includes a sensing block 310 and an inter-sensing block 312. Generally, the transceiver, such as cognitive radio transceiver 200, determines in the sensing block 310 whether or not the licensed frequency band is busy or idle. When it is determined that the licensed frequency band is idle, then the transceiver transmits data and/or control signals during the inter-sensing block 312. In contrast to previous systems in which the transmit power is held constant during transmissions in the inter-sensing block 312, embodiments of the present invention vary the transmit power dependent upon a non-interfering probability as discussed in greater detail below.

A probability-based transmit power control method within each data block between periodic spectrum sensing activities such as that described herein improves the bandwidth efficiency for dynamic spectrum access. By utilizing the statistical occupancy information of the licensed frequency band, the transmit power control method matches the non-interfering probability for each sampling point during data transmission. It helps the cognitive radio user to increase the effective transmission rate and significantly decrease the level of interference with possible returning licensed communication. It should be appreciated that such a system or method may considerably improve the overall bandwidth efficiency while ensuring the priority of the licensed user.

A cognitive radio user pair, each of the pair including a transmitter and a receiver, opportunistically operates on a single frequency band assigned to licensed users located in the same geographical region. With the help of a spectrum sensing module, such as the spectrum sensing module 222, the cognitive radio user determines the presence or absence of any licensed activity within the band, and utilizes the band when no licensed activity is detected.

As illustrated in FIG. 3, the activity of the cognitive radio user is usually periodic, such that in each frame the cognitive radio user first monitors the licensed frequency band in a sensing block 310 and then, dependent upon whether the licensed frequency band is busy or idle, remains silent or begins receiving/transmitting data in an inter-sensing block 312. Preferably, the sensing block monitors the licensed frequency band for M sampling intervals. Depending on whether the band is identified as busy or idle, the cognitive radio user will remain silent or start transmitting or receiving in the inter-sensing (silent or data) block for L sampling intervals. Since the licensed frequency band may be reoccupied or released by licensed users in the future, the cognitive radio user preferably restarts a new frame beginning with the sensing block 310 again following the previous inter-sensing block 312. The cognitive radio user may adopt a predetermined sensing block length M to achieve a certain detection performance and an optimal data block length L to achieve the maximal effective transmission rate under a certain level of interference with possible returning licensed communication. The sensing block 310 and/or the inter-sensing block 312 may also utilize flexible block lengths. Through successive spectrum sensing, the cognitive radio user obtains the statistics of licensed channel occupancy including the average busy and idle periods as discussed in greater detail below.

Figure 4:
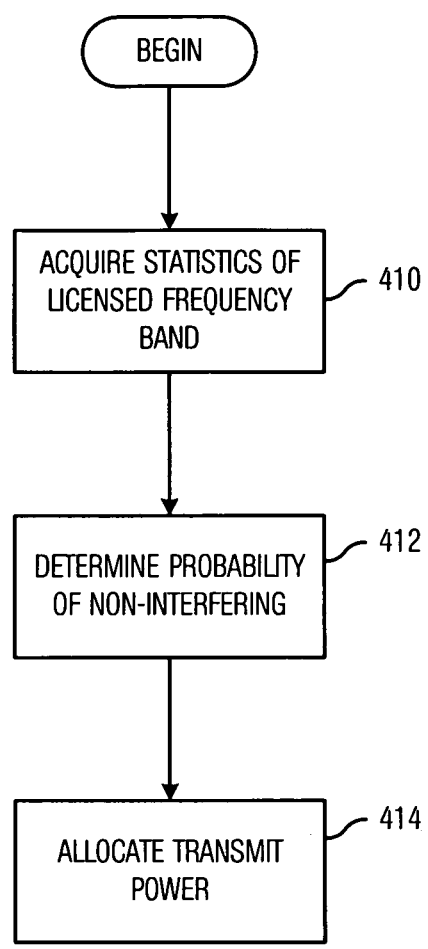
FIG. 4 is a diagram illustrating steps that may be performed to determine a transmit power in accordance with an embodiment of the present invention.

FIG. 4 illustrates steps that may be used to vary the transmit power in accordance with an embodiment of the present invention. The process begins in step 410, wherein statistical information such as the stationary probabilities of the licensed frequency band to be busy or idle is acquired. The licensed frequency band is modeled as an alternating renewal source that alternates between busy and idle states, where busy or idle denotes whether the licensed frequency band is occupied or unoccupied, respectively, by licensed users. The busy and idle periods are assumed to be exponentially distributed, with $\alpha$ as the transition rate from busy to idle state and $\beta$ as the transition rate from idle to busy state. Accordingly, the average busy and idle periods are $1/\alpha$ and $1/\beta$, and the stationary probabilities for the band to be busy and idle are $$\overline{P}_B = \frac{\beta}{\alpha + \beta} \tag{1}$$

and $$\overline{P}_I = \frac{\alpha}{\alpha + \beta}, \tag{2}$$

respectively.

Thereafter, in step 412, the probability of non-interfering is determined. The probability of non-interfering can be expressed by the following:

$$P_{I_l|\tilde{I}} = P_{I_l|B} P_{B|\tilde{I}} + P_{I_l|I} P_{I|\tilde{I}}, \tag{3}$$

where $P_{B|\tilde{I}}$ and $P_{I|\tilde{I}}$ are the conditional busy and idle probabilities at the end of the sensing block given that the band is detected as idle in the sensing block, respectively, and where $P_{I_l|B}$ and $P_{I_l|I}$ are the conditional idle probability at the lth sampling point given that the band is busy and idle, respectively, at the end of the sensing block. If the band is busy at the end of the sensing block, its conditional idle probability at the lth sampling point of the upcoming data block may be determined by:

$$P_{I_l|B} = 1 - e^{-\alpha/\tau}, \tag{4}$$

where $\tau$ denotes the sampling interval. If the band is idle at the end of the sensing block, its conditional idle probability at the lth sampling point of the upcoming data block may be determined by:

$$P_{I_l|I} \to e^{\beta/\tau}. \tag{5}$$

To calculate $P_{B|\tilde{I}}$ and $P_{I|\tilde{I}}$ let $P_D$ and $P_F$ denote the average detection probability and false alarm probability obtained through historic comparisons of spectrum sensing decisions and transmission acknowledgments as well as feedbacks. The conditional busy and idle probabilities at the end of the sensing block given that the band is detected as idle may be determined according to:

$$P_{B|\tilde{I}} = \frac{(1 - P_D)\overline{P}_B}{(1 - P_D)\overline{P}_B + (1 - P_F)\overline{P}_I} \tag{6}$$

and $$P_{I|\tilde{I}} = \frac{(1 - P_F)\overline{P}_I}{(1 - P_D)\overline{P}_B + (1 - P_F)\overline{P}_I}. \tag{7}$$

Next, in step 414, the transmit power is allocated. After the conditional probability $P_{I_l|\tilde{I}}$ is found for any time period l, it is desirable to maximize the average transmission rate of the cognitive user under the average power constraint $\overline{S}$. The average transmission rate within an entire frame consisting of a total number of sampling periods L may be determined according to:

$$\eta = \frac{\sum_{l=1}^{L} P_{I_l|\tilde{I}} R_l}{M + L}, \tag{8}$$

where $P_{I_l|\tilde{I}}$ is the conditional idle probability at the lth sampling point of the upcoming inter-sensing block 312 given that the band is detected as idle in the sensing block 310, and $R_l$ is the transmission rate of the cognitive radio user at the lth sampling point of the upcoming inter-sensing block 312 given that the band is idle. $R_l$ can be related with the transmit power $S_l$ at the lth sampling point as:

$$R_l = \log\left(1 + \frac{S_l G}{N}\right), \tag{9}$$

where G is the power gain from the cognitive radio transmitter to the receiver and N is the noise variance at the cognitive radio receiver, which are both assumed to be constant during a single data block. Generally, a larger average transmission rate indicates higher bandwidth efficiency.

Accordingly, it is desirable to maximize $$\eta = \frac{\sum_{l=1}^{L} P_{I_l|\tilde{I}} \log(1 + S_l G/N)}{M + L}, \tag{10}$$

subject to $$\frac{1}{L} \sum_{l=1}^{L} S_l \leq \overline{S} \tag{11}$$

where G is the power gain from the cognitive radio transmitter to the receiver and N is the noise variance at the cognitive radio receiver, which are both assumed to be constant during a single data block.

The optimal power allocation for any l, $S_l$ may be determined by $$S_l = \left(\frac{P_{I_l|\tilde{I}}}{\lambda} - \frac{N}{G}\right)^+ \tag{12}$$

where $(x)^+ = \max(x, 0)$ and the Lagrange multiplier $\lambda$ is chosen such that the following power constraint is met:

$$\frac{1}{L}\sum_{l=1}^{L}\left(\frac{P_{I_l|\hat{I}}}{\lambda} - \frac{N}{G}\right)^+ = \overline{S}. \quad (13)$$

From the above equations, it may be assumed that $$S_l = \frac{P_{I_l|\hat{I}}}{\lambda} - \frac{N}{G} \geq 0 \text{ for } l = 1, 2, \ldots, L.$$

So, $$\frac{1}{L}\sum_{l=1}^{L}\left(\frac{P_{I_l|\hat{I}}}{\lambda} - \frac{N}{G}\right) = \overline{S}$$

is known and $\lambda$ can be determined. If $S_l$ for any $l$ is verified no less than 0, the solution is found. Otherwise, $S_l$ is set to zero and the process is repeated.

If $N/G$ is small, i.e., the signal-to-noise ratio gain is large, the allocated transmit power at each sampling point can be approximated as $$S_l = \frac{P_{I_l|\hat{I}}}{\overline{P}_{I_l|\hat{I}}}\overline{S}, \quad (14)$$

where $$\overline{P}_{I_l|\hat{I}} = \frac{1}{L}\sum_{l=1}^{L} P_{I_l|\hat{I}}. \quad (15)$$

In this case, the transmit power $S_l$ is directly proportional to the conditional idle probability $P_{I_l|\hat{I}}$ at each sampling point. If the channel and noise information is unavailable at the cognitive radio transmitter, we can simply use equation (14) to allocate the transmit power as long as the signal-to-noise ratio gain is not small.

The transmission rate of the cognitive radio user may also be varied, matching the conditional idle probability. For example, the transmission rate may be varied by $$R_l = \log\left(1 + \frac{P_{I_l|\hat{I}}}{\overline{P}_{I_l|\hat{I}}} \frac{\overline{S}G}{N}\right). \quad (16)$$

The transmit power control scheme not only increases the average transmission rate, but only significantly reduces the average interference power, which is beneficial for both cognitive radio and licensed users. The average interference power may be defined as the expected interference power at the licensed receiver from cognitive radio communication within the whole frame, which can be expressed as $$\varepsilon = \frac{\sum_{l=1}^{L} P_{B_l|\hat{I}} S_l G'}{M + L}, \quad (17)$$

where $P_{B_l|\hat{I}} = 1 - P_{I_l|\hat{I}}$ is the conditional busy probability at the lth sampling point of the upcoming inter-sensing block given that the band is detected as idle in the sensing block, and G' is the power gain from the cognitive radio transmitter to the licensed receiver, which is assumed to be constant during the data block. In order to provide sufficient protection of the licensed communication, it is usually required that the average interference power is constrained within an acceptable level.

It should be appreciated that the description above provides one example of an embodiment in which the transmit power is varied based upon a probability of a returning licensed user and that other embodiments may also be used. For example, a smoothly decreasing function with a data sample index may also be used, but may exhibit some performance loss.

Figure 5:
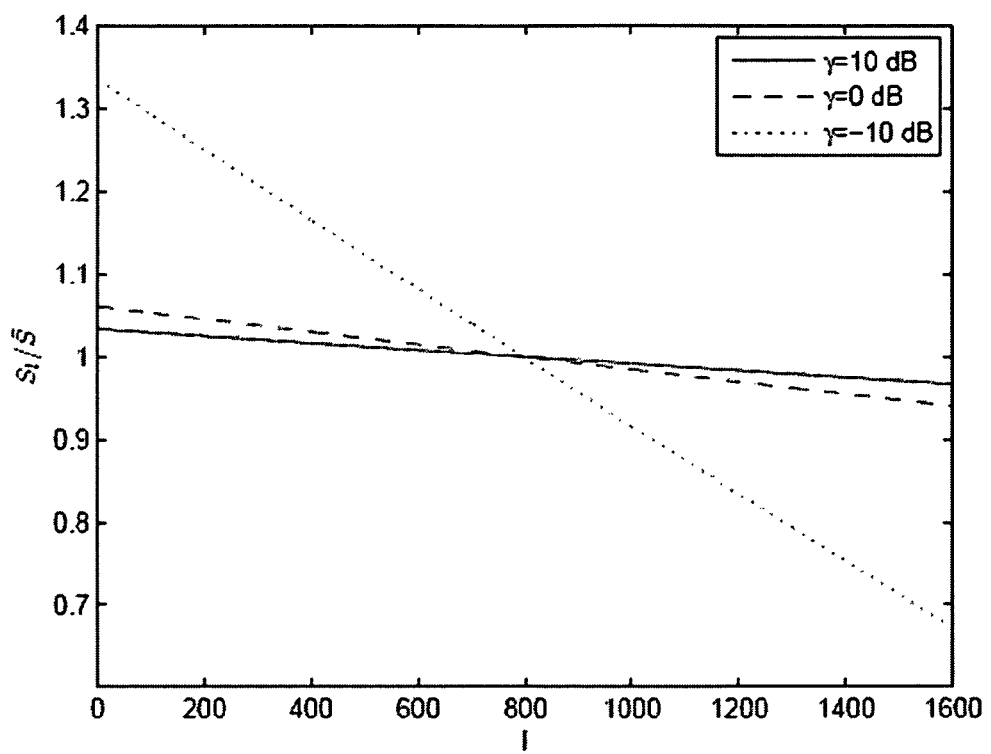
FIG. 5 is a graph showing normalized transmit power allocations at different sampling points in accordance with an embodiment of the present invention.

FIG. 5 illustrates results that may be obtained from a system such as that discussed above. Given $\tau=0.0001$ sec, $M=50$, $L=1600$, $p_D=0.95$, $p_F=0.1$, $\alpha=0.4$ sec$^{-1}$, and $\beta=0.4$ sec$^{-1}$, the normalized transmit power $S_l/\overline{S}$ at each sampling point l for different values of the average receive SNR $\gamma=\overline{S}G/N$ of our scheme is shown in FIG. 5. The conventional constant power allocation method is also shown in FIG. 5. It can be noticed that instead of keeping the power level constant, our scheme matches the transmit power level with the decreasing conditional idle probability at each sampling point. When the average receive SNR is getting smaller, the difference between power allocations at neighboring sampling points are more noticeable, and the performance gain is expected to be correspondingly larger.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of transmitting data in a frame, the method comprising:
   sensing during a sensing block of the frame whether a frequency band is idle or busy;
   deriving, by an unlicensed user device, a probability of interference for a plurality of periods of an inter-sensing block of the frame in accordance with an idle-to-busy transition rate of the frequency band, wherein the idle-to-busy transition rate specifies an average number of periods required for licensed users to transition from an idle state to a busy state when performing licensed transitions over the frequency band;
   performing, by the unlicensed user device, an unlicensed transmission in the inter-sensing block of the frame; and
   reducing, by the unlicensed user device, a transmit power level of the unlicensed transmission across later time periods of the inter-sensing block in the frame in accordance with the probability of interference for the later time periods to reduce the probability of the unlicensed transmission in the frame disrupting reception of a licensed communication signal in a subsequent frame, wherein the probability of interference for a given period of the frame corresponds to a likelihood that the unlicensed transmission of the unlicensed user device during the given period of the frame will interfere with reception of the licensed communication signal in the subsequent frame, and
   wherein deriving the probability of interference for a plurality of periods of an inter-sensing block of the frame comprises determining the probability of interference in accordance with the following equation: $P_{I_l|\tilde{I}} = P_{I_l|B} P_{B|\tilde{I}} + P_{I_l|I} P_{I|\tilde{I}}$, where $P_{B|\tilde{I}}$ is a conditional idle-to-busy probability at the end of the sensing block, $P_{I|\tilde{I}}$ is a conditional idle-to-idle probability at the end of the sensing block, $P_{I_l|B}$ is a conditional idle-to-busy probability at an lth sampling point, and $P_{I_l|I}$ is a conditional idle-to-idle probability at the lth sampling point.

2. The method of claim 1, wherein deriving the probability of interference for the plurality of periods of the inter-sensing block of the frame comprises:
   acquiring statistical occupancy information by detecting activity in the frequency band; and
   deriving the idle-to-busy transition rate of the frequency band in accordance with the statistical occupancy information.

3. The method of claim 2, wherein the statistical occupancy information includes average present and absent periods of licensed activity.

4. The method of claim 2, wherein the statistical occupancy information is acquired from previous measurements of the frequency band through sequential spectrum sensing.

5. The method of claim 1, wherein the probability of interference is based at least in part on an average detection probability.

6. The method of claim 1, wherein the probability of interference is based at least in part on a false alarm probability.

7. The method of claim 1, wherein the power level is varied utilizing a smoothly decreasing function.

8. An apparatus for transmitting data in a frame, the apparatus comprising:
   a processor; and
   a computer readable storage medium storing programming for execution by the processor, the programming including instructions to:
     acquire statistical occupancy information on use of a frequency band;
     determine a probability of interference for a plurality of time periods in an inter-sensing block of the frame in accordance with an idle-to-busy transition rate of the frequency band, wherein the idle-to-busy transition rate specifies an average number of periods required for licensed users to transition from an idle state to a busy state when performing licensed transitions over the frequency band;
     perform an unlicensed transmission in the inter-sensing block of the frame; and
   reduce a transmit power level of the unlicensed transmission over later time periods of the inter-sensing block in the frame in accordance with the probability of interference for the later time periods to reduce the probability of the unlicensed transmission in the frame disrupting reception of a licensed communication signal in a subsequent frame, wherein the probability of interference for a given period of the frame corresponds to a likelihood that the unlicensed transmission during the given period of the frame will interfere with reception of the licensed communication signal in the subsequent frame, and
   wherein the instructions to determine the probability of interference include instructions to determine the probability of interference in accordance with the following equation: $P_{I_l|\tilde{I}} = P_{I_l|B} P_{B|\tilde{I}} + P_{I_l|I} P_{I|\tilde{I}}$, where $P_{B|\tilde{I}}$ is a conditional idle-to-busy probability at the end of the sensing block, $P_{I|\tilde{I}}$ is a conditional idle-to-idle probability at the end of the sensing block, $P_{I_l|B}$ is a conditional idle-to-busy probability at an lth sampling point, and $P_{I_l|I}$ is a conditional idle-to-idle probability at the lth sampling point.

9. The apparatus of claim 8, wherein the idle-to-busy transition rate is derived from the statistical occupancy information, and wherein the statistical occupancy information includes average present and absent periods of licensed activity.

10. The apparatus of claim 9, wherein the instructions to acquire the statistical occupancy information include instructions to acquire the statistical occupancy information from previous measurements of the frequency band through sequential spectrum sensing.

11. The apparatus of claim 8, wherein the probability of interference is based at least in part on an average detection probability.

12. The apparatus of claim 8, wherein the probability of interference is based at least in part on a false alarm probability.

13. A transceiver for transmitting data, the transceiver comprising:
   a memory;
   a processor coupled to the memory; and
   a transmitter coupled to the processor, the transmitter configured to perform an unlicensed transmission during an inter-sensing block of a frame transmitted in a frequency band; and
   a receiver coupled to the processor, wherein the processor is configured to determine a probability of interference for a plurality of periods of an inter-sensing block of the frame in accordance with an idle-to-busy transition rate of the frequency band, and to reduce a power level of the unlicensed transmission over later time periods of the inter-sensing block in the frame in proportion to the probability of interference for the later time periods of the inter-sensing block to reduce a probability of the unlicensed transmission in the frame disrupting reception of a licensed communication signal in a subsequent frame, wherein the idle-to-busy transition rate specifies an average number of periods required for licensed users to transition from an idle state to a busy state when performing licensed transitions over the frequency band,
   wherein the probability of interference for a given period of the frame corresponds to a likelihood that the unlicensed transmission during the given period of the frame will interfere with reception of the licensed communication signal in the subsequent frame, and
   wherein the processor is configured to determine the probability of interference in accordance with the following equation: $P_{I_l|\tilde{I}} = P_{I_l|B} P_{B|\tilde{I}} + P_{I_l|I} P_{I|\tilde{I}}$, where $P_{B|\tilde{I}}$ is a conditional idle-to-busy probability at the end of the sensing block, $P_{I|\tilde{I}}$ is a conditional idle-to-idle probability at the end of the sensing block, $P_{I_l|B}$ is a conditional idle-to-busy probability at an lth sampling point, and $P_{I_l|I}$ is a conditional idle-to-idle probability at the lth sampling point.

14. The transceiver of claim 13, wherein the probability of interference is determined based on measurements made during a sensing block for an inter-sensing block.

15. The transceiver of claim 13, wherein the transmitter varies a power level for a plurality of sampling points based upon the probability of interference for each respective sampling point.

16. The transceiver of claim 13, wherein the processor is further configured to acquire statistical occupancy information of activity in the frequency band.

17. The transceiver of claim 16, wherein the statistical occupancy information includes average present and absent periods of licensed activity.

18. The transceiver of claim 16, wherein the statistical occupancy information is acquired from previous measurements of the frequency band through sequential spectrum sensing.

* * * * *